United States Patent
Marlow et al.

(10) Patent No.: US 7,066,066 B2
(45) Date of Patent: Jun. 27, 2006

(54) CONTINUOUS ROTARY HOLE PUNCHING METHOD AND APPARATUS

(75) Inventors: John V. Marlow, Oakville (CA); Omer E. Kilic, Toronto (CA); Nimrod I. Major, Courtice (CA)

(73) Assignee: Teck Cominco Metals Ltd., Vancouver (CA)

(*) Notice: Subject to any disclaimer, the term of this patent is extended or adjusted under 35 U.S.C. 154(b) by 81 days.

(21) Appl. No.: 10/799,718

(22) Filed: Mar. 15, 2004

(65) Prior Publication Data

US 2005/0199110 A1    Sep. 15, 2005

(51) Int. Cl.
*B26D 1/56*    (2006.01)
*B26F 1/06*    (2006.01)

(52) U.S. Cl. .................. 83/37; 83/39; 83/343; 83/670

(58) Field of Classification Search .................. 83/663, 83/667, 669, 670, 673, 678, 37, 39, 50, 55, 83/303, 331, 343, 27, 30, 109, 113–116
See application file for complete search history.

(56) References Cited

U.S. PATENT DOCUMENTS

| | | | | |
|---|---|---|---|---|
| 3,706,250 A | * | 12/1972 | Herd | 83/678 |
| 3,875,836 A | | 4/1975 | Hutchinson et al. | |
| 4,074,599 A | * | 2/1978 | Allen | 83/678 |
| 4,534,248 A | | 8/1985 | Andersson | |

(Continued)

FOREIGN PATENT DOCUMENTS

| | | | |
|---|---|---|---|
| DE | 4130673 | * | 3/1993 |
| DE | 4319300 | * | 12/1994 |
| EP | 0492428 | * | 7/1992 |
| WO | WO 01/34320 | | 5/2001 |

OTHER PUBLICATIONS

Sheet Metal Industries, 1985, vol. 62, Issue 2, Title "Rotary-Blanking", p. 134-135.

(Continued)

*Primary Examiner*—Stephen Choi
(74) *Attorney, Agent, or Firm*—Arne I. Fors

(57) ABSTRACT

A method and apparatus for continuous, high-speed production of punched strip having an array of high-tolerance closely-spaced holes with positive ejection of waste punch-out material. A first pair of opposed rotary dies, one a female die and the other a male/female die, punches a first set of holes in a strip fed continuously between the dies, and a second pair of opposed rotary dies, one the male/female die and the other a male die, punches a second set of holes in the strip between the first set of holes, the strip being wrapped about the common male/female die during punching of the first and second sets of holes to continuously index the strip with the two opposed pairs of rotary dies to ensure production of the high-tolerance closely-spaced holes. A plurality of angular segments mounted in an annulus formed in proximity to the perimeter of the dies adapted for controlled radial travel of the angular segments during rotation of the dies, each angular segment having at least one ejector pin for radial reciprocal travel in a die recess, ejects punch-out material from the recess.

15 Claims, 8 Drawing Sheets

U.S. PATENT DOCUMENTS

| | | | | |
|---|---|---|---|---|
| 4,561,334 A | * | 12/1985 | Sarka | 83/27 |
| 4,811,641 A | | 3/1989 | Muller | |
| 5,140,880 A | | 8/1992 | Littleton | |
| 5,363,728 A | | 11/1994 | Elsner et al. | |
| 5,449,482 A | | 9/1995 | Faddar et al. | |

OTHER PUBLICATIONS

Paper entitled "Rotary Blanking" by Institute for Metal Forming and Casting, Technische Universitat Munchen, Germany, published Jan. 10, 1999, p. 213-216.

* cited by examiner

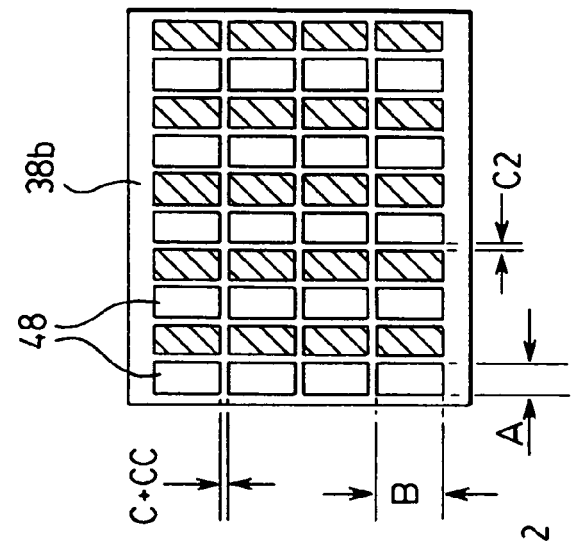
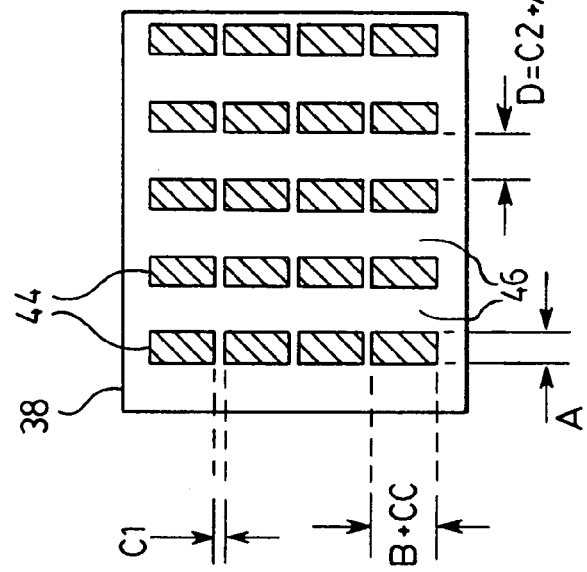
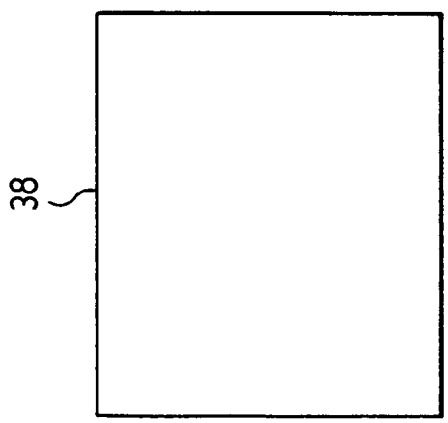

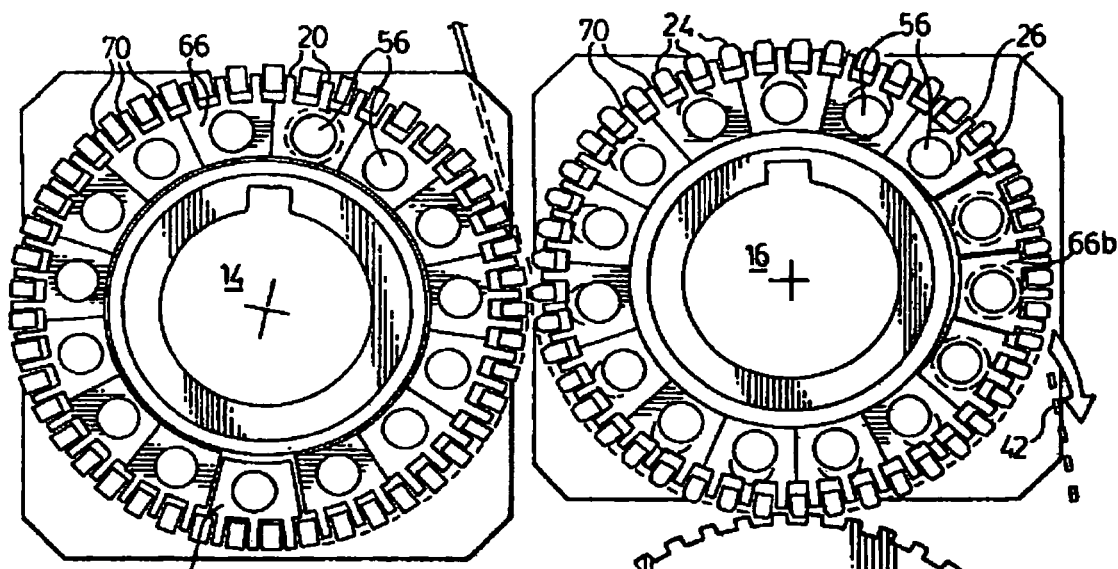
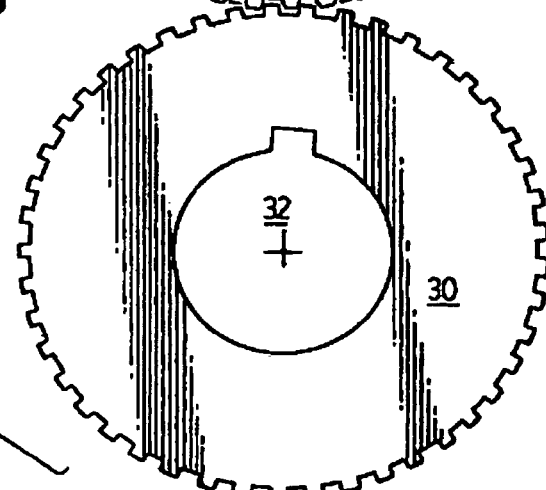
FIG. 9.
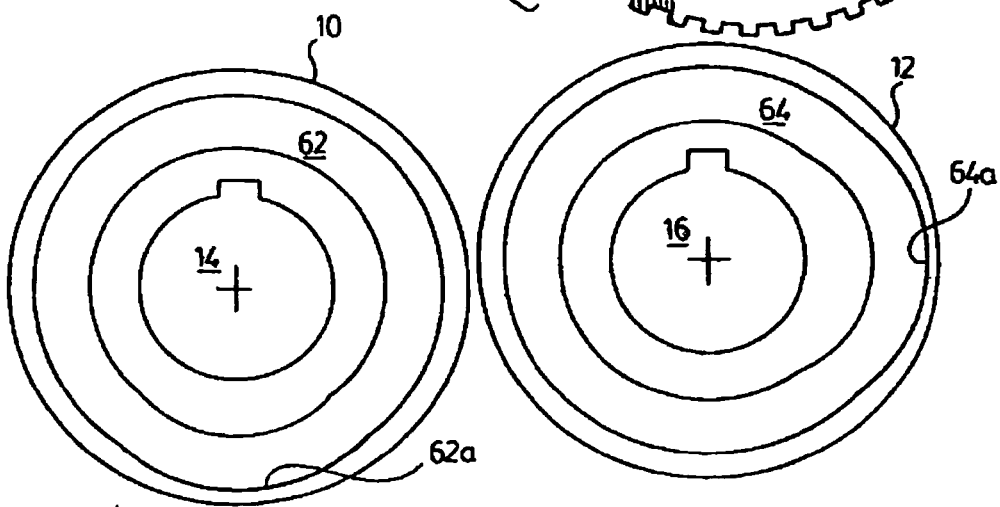
FIG. 10.

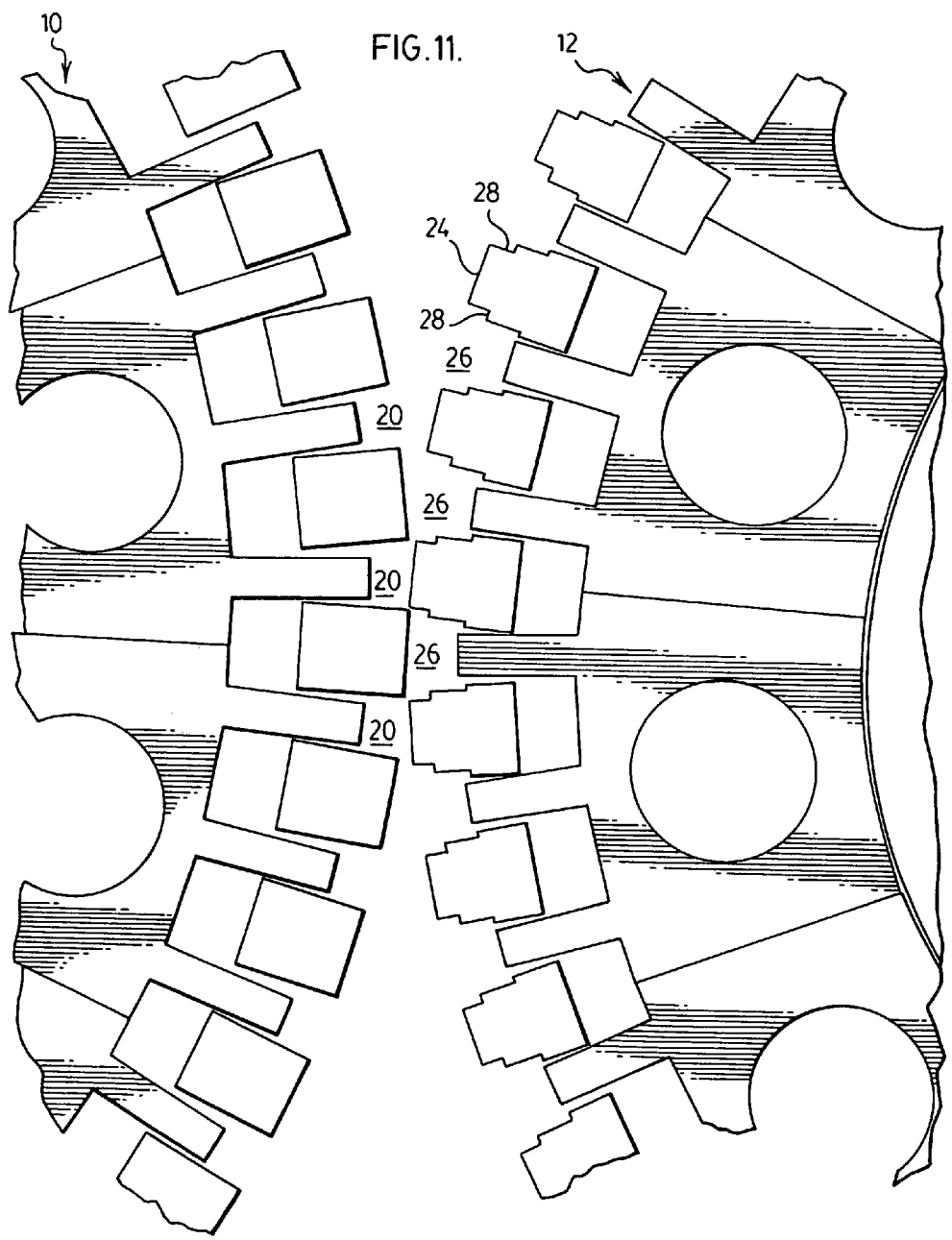

CONTINUOUS ROTARY HOLE PUNCHING METHOD AND APPARATUS

BACKGROUND OF THE INVENTION (i) Field of the Invention

This invention relates to a method and apparatus for the punching of holes in deformable strip and, more particularly, relates to a method and apparatus for continuously punching an array of holes in deformable strips such as lead strip for the production of lead grids for use in the manufacture of lead-acid batteries.

(ii) Description of the Related Art

Existing methods for punching material strips incur problems including low production speed, inadequate or no waste ejection, insufficient indexing precision, hole size and spacing tolerance errors, and the distortion or destruction of the final product. Previously, rotary punching of a deformable strip have employed rotary equipment having two or three shafts, each with a circumferentially distributed homogeneous male or female tool set. The rotation of adjacent shafts would be synchronized mechanically or electronically and their respective peripheral tools would interact to punch a continuous grid of holes in the strip.

Several embodiments of tooling configurations have been employed. The more traditional method of punching involved a reciprocating toolset in which male and female dies stamped one section of a material to be punched, which then had to be indexed before further punching could take place.

To punch small, closely spaced holes, attempts were made to use rotary punching technology from the metal, cardboard and plastics industry. These rotary punching methods typically create relatively large or elongated holes that are spaced quite infrequently on the material to be punched, permitting use of male/female dies that are circumferentially spaced quite far apart on the rotating shafts. U.S. Pat. No. 4,534,248 granted Aug. 13, 1985 and PCT Patent Application PTC/CA00/01288 published May 17, 2001 typify such technology. Punching produces scrap that has to be removed or ejected from the female die using some moving mechanism. These mechanically moving parts must be sufficiently robust to endure cycling, but for small, closely spaced holes there is insufficient space on a shaft for any sort of ejection mechanism, robust or otherwise. Thus, these systems have been difficult to implement and to adapt for the punching of closely spaced holes.

To counter the problems of space and moving parts, multi-stage punching with increased hole spacing was attempted. This required punching of one set of holes with one set of tooling and then indexing the punched material to another set of tooling to punch a second set of holes. Each set of tooling was on a separate shaft and, since they each had to punch fewer holes, the dies could be place farther apart, leaving sufficient room for ejecting mechanisms in the shaft. However, the problem of indexing the material to be punched from one set of tooling to the next, without compromising hole size and spacing tolerances persisted. As a result, there were frequent issues with subsequent holes not being placed the appropriate distance from the first set of holes and tolerance errors accumulated. This is confirmed in a paper entitled Rotary-Blanking published in the journal: Sheet Metal Industries, 1985, Vol. 62, Issue 2, p. 134–135, in which it is acknowledged in the Conclusions that "Co-ordination of the rollers when several tools are mounted on the circumference is still to be solved".

One step punching was tested in an effort to avoid the need for indexing. However, not only did the punched material not eject, but the finished product was reluctant to peel from between the male dies. Mesh had to be forcefully stripped from the male dies, which ruined the final product. Also, the entrapped waste would build up in the holes on the female shaft and cause the mechanism to seize, resulting in broken tooling. A paper entitled Rotary Blanking published Jan. 10, 1999 by Institute for Metal Forming and Casting, Technische Universitat Munchen, Germany states "As an effect of the special kinematic conditions, certain concessions concerning the quality of the sheared edges and geometrical accuracy have to be made". This paper also states "Products with many rows of holes, in particular in combination with close hole spacings in feed direction, can only be manufactured by rotary blanking at great expense. On the one hand, large roller diameters are required to minimize the deflection of the rollers and improve the quality of the workpiece. On the other hand, the number of punches, which rises with the roller diameter and the number of rows, lets maintenance of the tools become very costly. Therefore, the most advantageous application of rotary blanking is the manufacturing of punched and pierced sheet metal products with a few number of rows and contours of a large length-to-width-ratio."

Conventional non-rotary punching has addressed the problem of punching many closely spaced, small holes. The successful methods employ a reciprocating punch that stamps one large section of grid at a time, and then indexes the deformable strip downstream before stamping another section of the grid. This segmented approach is production-rate limiting and is relatively slow compared to rotary punching because the process is stop-and-go as opposed to continuous. These reciprocating punch presses must be robust and powerful to punch metal and the constant change in momentum due to machine oscillation creates problems with noise, precision and vibration. Indexing the strip between punches can also result in imprecision of hole placement between one set of punched holes and the next.

Indexing also has a down-stream effect on the production of mesh from lead strip because it causes a jerky motion in the movement of the lead strip. This can possibly damage the lead mesh or make it difficult to smoothly integrate the mesh into the next phase of processing.

Rotating punches that have been applied to the metal industry often rely on the shearability of a metals like steel and aluminium which do not deform plastically as much as lead and other soft materials. Even when using steel and aluminium, these rotary punches often leave burs and unclean or ragged cuts, which can result in an unacceptable accumulation of errors.

It is a principal object of the present invention therefore to provide a method and apparatus for continuous punching of deformable strip at high speed to produce a punched grid having a high tolerance, closely spaced array of holes. It is another object of the of the invention to provide two-stage rotary punch apparatus which is self-indexing for high speed production of a uniformly punched grid. Another object of the invention is the provision of a rotary punching machine which will continuously eject waste material and which readily releases the final punched product. A still further object of the invention is the provision of a rotary punching machine for punching closely spaced holes in deformable materials typified by metals and metal alloys such as lead and lead alloys, aluminum, brass, copper, steel and zinc, plastics such as Mylar™ and vinyl; cardboard and the like deformable materials.

SUMMARY OF THE INVENTION

The method and apparatus of the present invention substantially overcomes the problems of the prior art and permits continuous, high-speed production of punched strip having an array of high-tolerance closely-spaced holes with positive ejection of waste material.

In a preferred embodiment of the invention, a first pair of opposed rotary dies, one a female die and the other a male/female die, punches a first set of holes in a strip fed continuously between the dies, and a second pair of opposed rotary dies, one the male/female die and the other a male die, punches a second set of holes in the strip between the first set of holes, the strip being wrapped about the common male/female die during punching of the first and second sets of holes to continuously index the strip with the two opposed pairs of rotary dies to ensure production of high-tolerance closely-spaced holes.

In its broad aspect, the method of the invention for continuously punching an array of closely-spaced holes in a deformable strip in a rotary punch comprises feeding said deformable strip between a female rotary die having a cylindrical periphery with a plurality of spaced recesses formed on the cylindrical periphery and a male/female rotary die having a cylindrical periphery with a plurality of alternating spaced punches and recesses formed on the cylindrical periphery for mating of punches of the male/female rotary die with corresponding recesses of the female die, rotating said female and male/female dies concurrently for punching a first set of spaced holes in the deformable strip along the deformable strip, feeding said punched deformable strip between said male/female rotary die and a male rotary die having a cylindrical periphery with a plurality of spaced punches formed on the cylindrical perimeter for mating of punches of the male rotary die with corresponding recesses of the male/female rotary die, and rotating said male/female die concurrently with the male die for punching a second set of holes in the strip between the first set of spaced holes along the deformable strip. Preferably, each set of spaced holes comprises a plurality of holes spaced along the length of the strip and across the width of the strip. The holes may be equispaced along the strip and/or across the strip. Alternatively, the holes may be variably spaced along the strips and/or across the strip, or staggered across the width of the strip.

In a preferred aspect of the invention, the method of the invention includes mounting a plurality of angular segments continuously about an annulus formed in each of the cylindrical female die and the cylindrical male/female die in proximity to the perimeter of the respective cylindrical dies, each angular segment having at least one ejector pin for radial reciprocal travel in a die recess, and moving the angular segments radially outwardly at a selected angle of rotation of the cylindrical female die and of the cylindrical male/female die for ejecting punched material from the die recesses. A plurality of cam rollers extending loosely across each of the cylindrical female die and the cylindrical male/female die are provided, each cam roller passing through an angular segment for moving said angular segment radially inwardly and outwardly in the die annulus for reciprocal radial movement of a die ejector pin in a die recess, and moving the cam rollers and associated angular segments outwardly at a selected angle of rotation of each of the dies whereby the angular segment ejector pins eject punched material from the cylindrical dies at the selected angles of rotation. Opposite ends of the cam rollers are mounted in opposed stationary cam raceways formed on each side of each cylindrical die for controllably moving the cam rollers radially inwardly and outwardly as the dies rotate.

In its broad aspect, the apparatus of the invention for continuously rotary punching an array of closely-spaced holes in a deformable strip comprises a cylindrical female die having a plurality of spaced recesses formed about its periphery and mounted for rotation in a frame, a cylindrical male/female die having a plurality of alternating spaced punches and recesses formed about its periphery and mounted for rotation in said frame for mating the punches of the male/female die with corresponding recesses in the female die, and a cylindrical male die having a plurality of spaced punches formed about its periphery mounted for rotation in said frame for mating of the punches of the male die with corresponding recesses in the male/female die, whereby interaction of the punches of the male/female die with corresponding recesses of the female die and interaction of the punches of the male die with the recesses of the male/female die index the female, male/female and male dies during rotation. Each of the punches in the male/female die has a shoulder formed on each side of the punch for supporting the deformable material and defining the recesses for mating with the punches in the male die.

The apparatus of the invention additionally comprises means for continuously ejecting punched material from the female die and from the male/female die during rotary punching of the deformable strip. The means for continuously ejecting punch-out material comprises a plurality of angular segments mounted in an annulus formed in proximity to the perimeter of the dies continuously about the perimeter of the dies adapted for controlled radial travel of the angular segments during rotation of the dies, each angular segment having at least one ejector pin, preferably three pin ejectors, for radial reciprocal travel in a die recess, whereby outward radial travel of the pin ejects punch-out material from the recess.

Preferably each die has a plurality of spaced cam rollers extending loosely across the die in the annulus in proximity to the die perimeter, each cam roller passing through an angular segment for moving said angular cam segment radially inwardly and outwardly in the die, and a pair of opposed stationary cam raceways mounted in the frame at each side of the die for receiving opposite ends of the cam rollers for controllably moving the cam rollers radially inwardly and outwardly as the die rotates.

In a preferred aspect of the apparatus of the invention, the cylindrical female die comprises a plurality of discs assembled side-by-side, each disc having a plurality of the spaced recesses formed about its periphery in lateral alignment across the die, said cylindrical male/female die comprises a plurality of discs assembled side-by-side, each disc having a plurality of the alternating spaced punches and recesses formed about its periphery in lateral alignment across the male/female die for mating of the punches of the male/female die in lateral alignment across the male/female die with corresponding recesses in the female die in lateral alignment across the female die, and said cylindrical male die comprises a plurality of discs assembled side-by-side, each disc having a plurality of the spaced punches formed about its periphery in lateral alignment across the male die for mating of the punches of the male die with the corresponding recesses in the male/female die in lateral alignment across the male/female die. The spaced recesses formed on the female die, the alternating punches and recesses formed on the male/female die, and the punches formed on the male die may be equispaced about the periphery of each of said dies, may be equispaced in lateral alignment across the dies, or may equispaced about the periphery of the dies and staggered across the dies. Alternatively, the spaced recesses formed on the female die, the punches and recesses formed on the male/female die, and the punches formed on the male die may be variably spaced about the periphery of each of said dies, variably spaced and in lateral alignment across the dies, variably spaced about the periphery of the dies and in lateral alignment across the dies, or variably spaced about the periphery of the dies and staggered across the dies.

The continuous indexing of the strip can be accredited to the second shaft having the male/female die which plays three roles throughout the grid production. First, it functions as a male die, punching the set of first rows of spaced-apart holes into the strip against the first shaft, acting as the female die. Second, the male dies proceed to index the material using the male dies which are snugly positioned in the rows of holes punched in the first step. Third, the second shaft acts as a female die, and allows another toolset, on shaft three, to accurately punch the second set of rows of holes into the spaces between the first set of rows of holes. The result is a continuous array of accurately punched closely spaced holes in a continuous grid of the constituent deformable material.

The rotary punch apparatus of the invention has the ability to eject waste from the female dies in a rotating punch machine while punching closely spaced holes. The waste ejection mechanism of the invention obviates the need for complicated moving parts within the die shaft and the need for mechanisms that have to be synchronized with rotation and for parts that must be robust and able to stand up to extensive cycling.

A practical ejector mechanism was achieved by grouping, what is otherwise a multitude of small closely spaced moving parts, into a practical mechanical arrangement in larger units. This grouping of ejectors, e.g. grouping of the three ejectors into one, renders positive ejection of waste practicable, even though the holes are very closely spaced (0.030 inch).

Although the description will proceed by way of example with reference to the punching of lead and lead alloy deformable strip, it will be understood that the term "deformable strip" includes deformable metals and metal alloys such as lead, lead alloy, aluminum, brass, copper, steel and zinc, plastic strip such as Mylar™ and vinyl; cardboard, and the like deformable materials which can be processed in accordance with the method of the invention.

A planar strip having an array of closely-spaced holes for manufacturing battery plates can be produced by the method of the invention, in which the strip has a thickness of about 0.03 inch and has a plurality of longitudinally-spaced transverse rows of punched holes of desired size and shape representing removal of up to about 96% strip material with a residual wire thickness as thin as 0.010 inch.

BRIEF DESCRIPTION OF THE DRAWINGS

The method and apparatus of the invention will now be described with respect to the accompanying drawings, in which:

FIGS. 8a, 8b illustrate the two-stage indexed rotary cutting sequence on a and 8c deformable strip;

FIG. 9 is a side elevation view illustrating the roller cam assembly of the invention;

FIG. 10 is a side elevation showing the cam raceway for receiving the ends of cam rollers shown in FIG. 9; and FIG. 11 is an enlarged view of cam follower ejectors in a retracted position.

DESCRIPTION OF THE PREFERRED EMBODIMENTS

Figure 1:
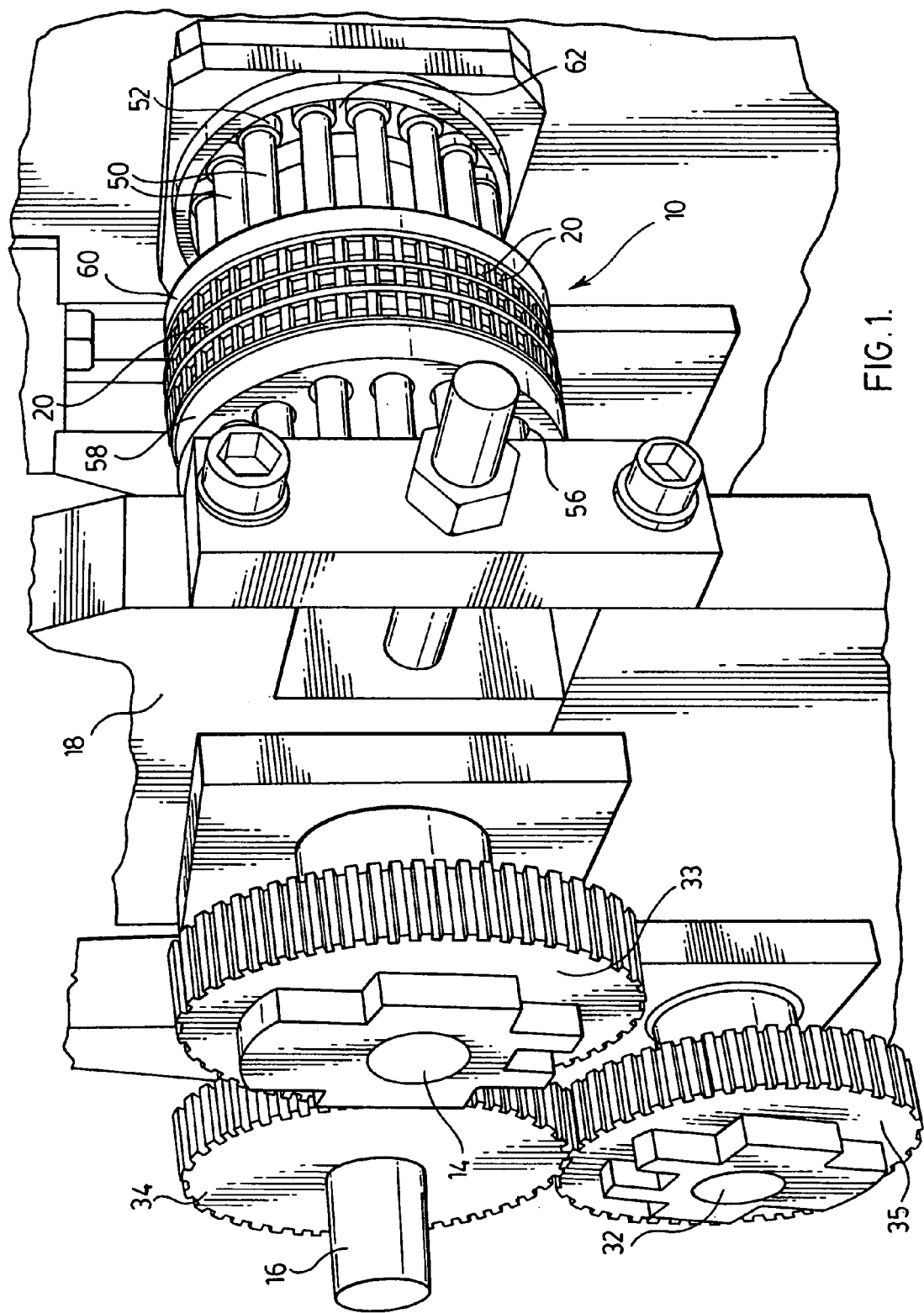
FIG. 1 is a perspective view of a two-stage, indexed, rotary punching assembly of the present invention showing three rows of punches and ejectors.
Figure 2:
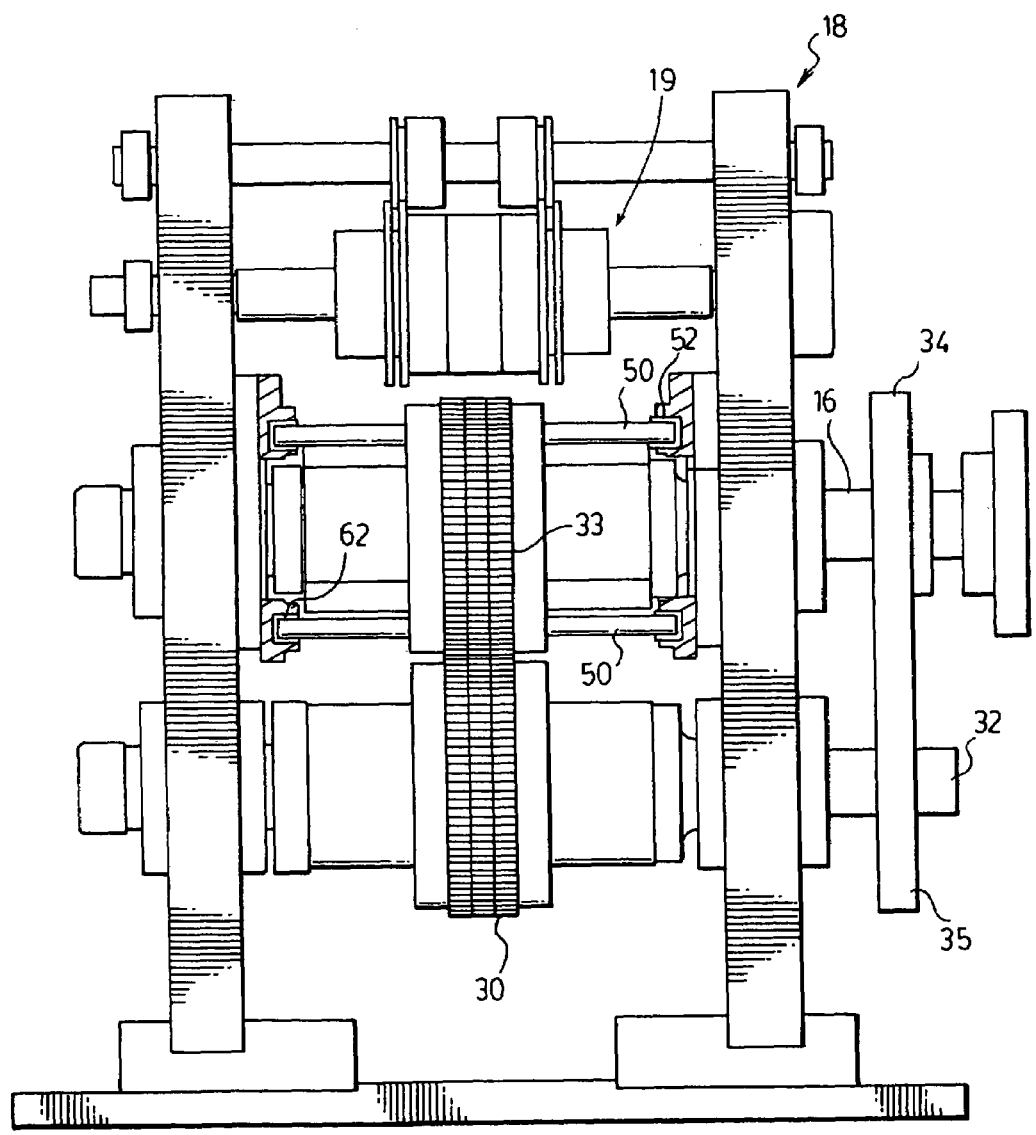
FIG. 2 is an end elevation of the assembly shown in FIG. 1 illustrating cam roll followers and cam raceways.
Figure 3:
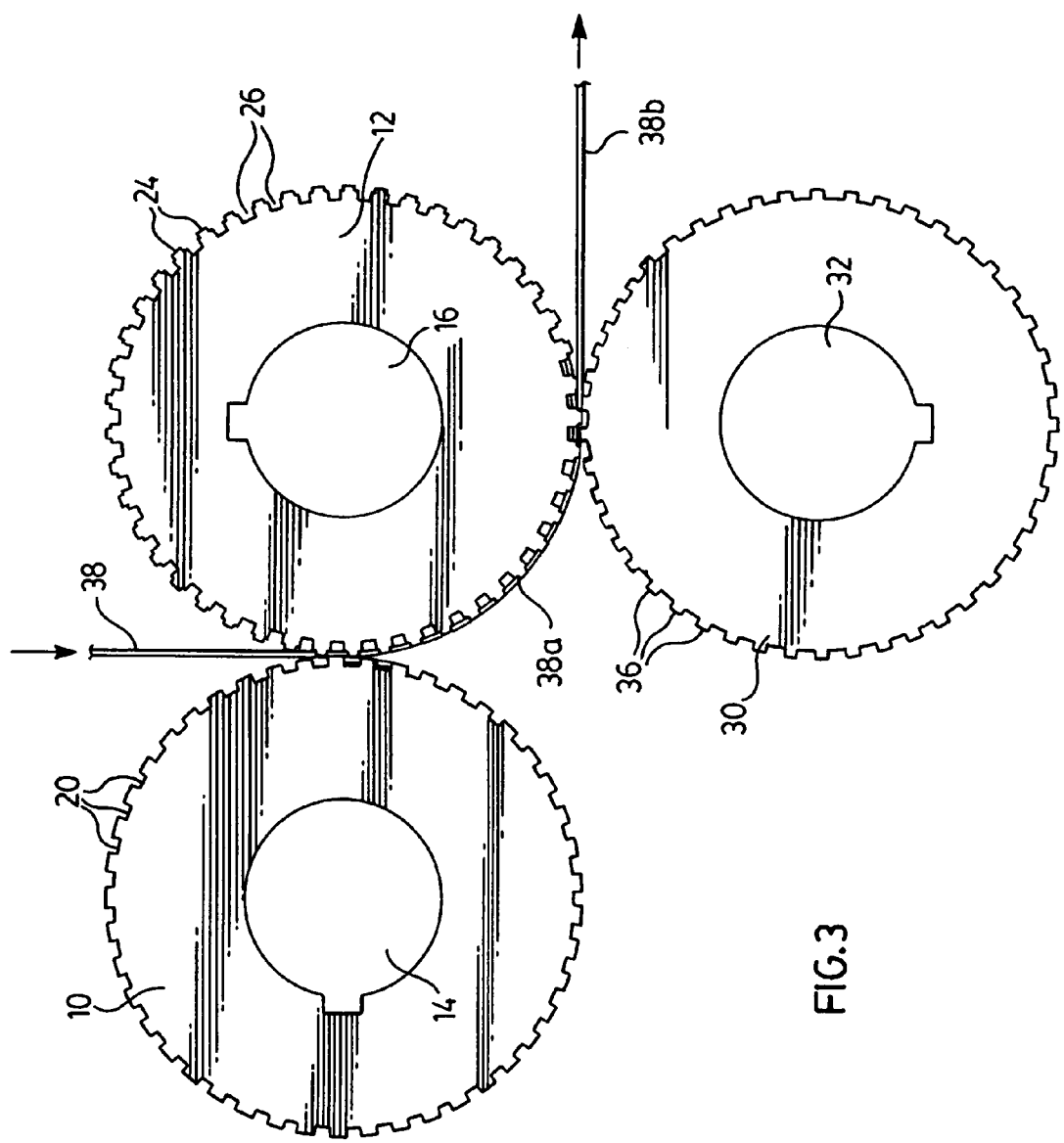
FIG. 3 is a side elevation of the rotary punching assembly of the invention.
Figure 4:
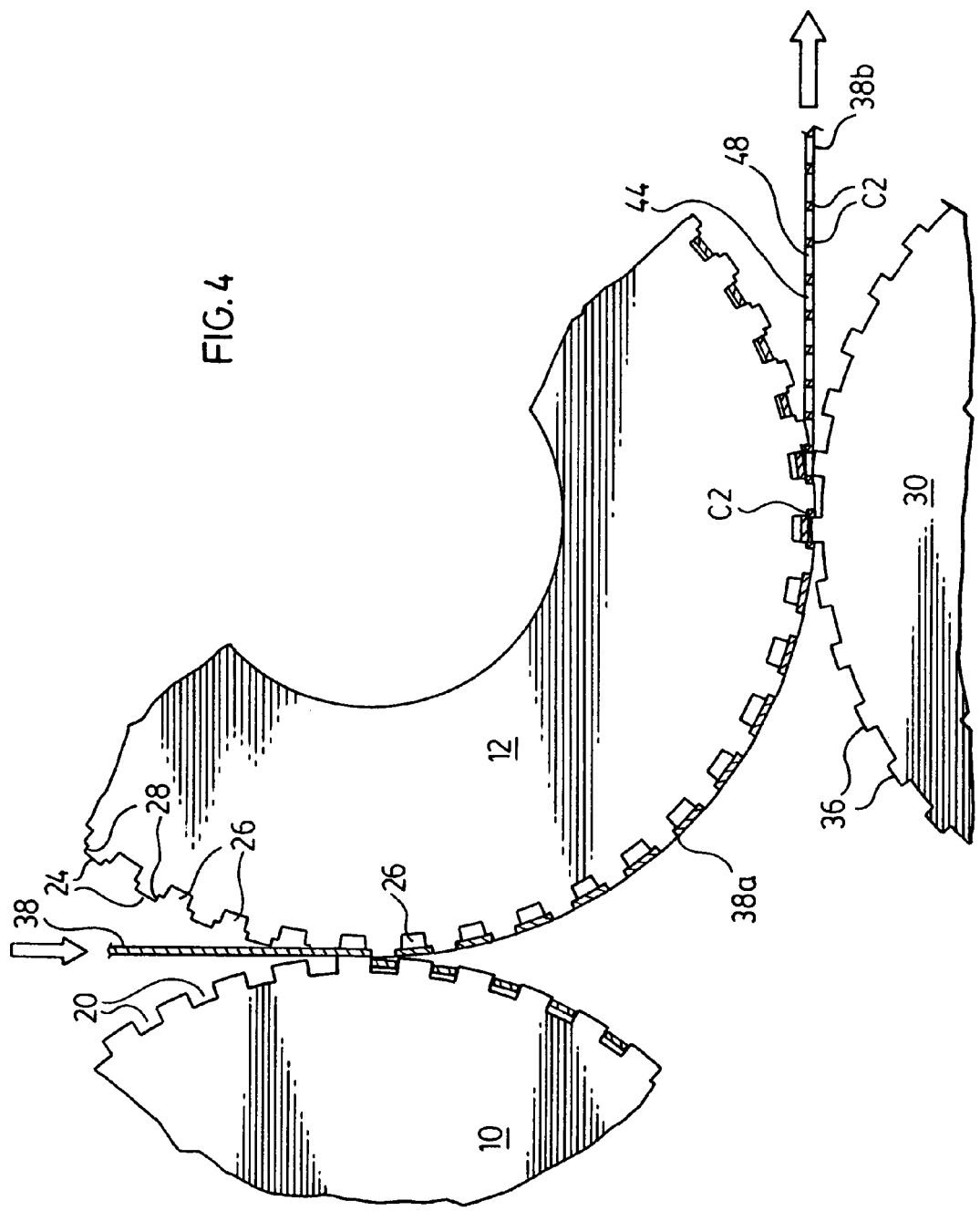
FIG. 4 is an enlarged side elevation of the assembly shown in FIG. 3.
Figure 5:
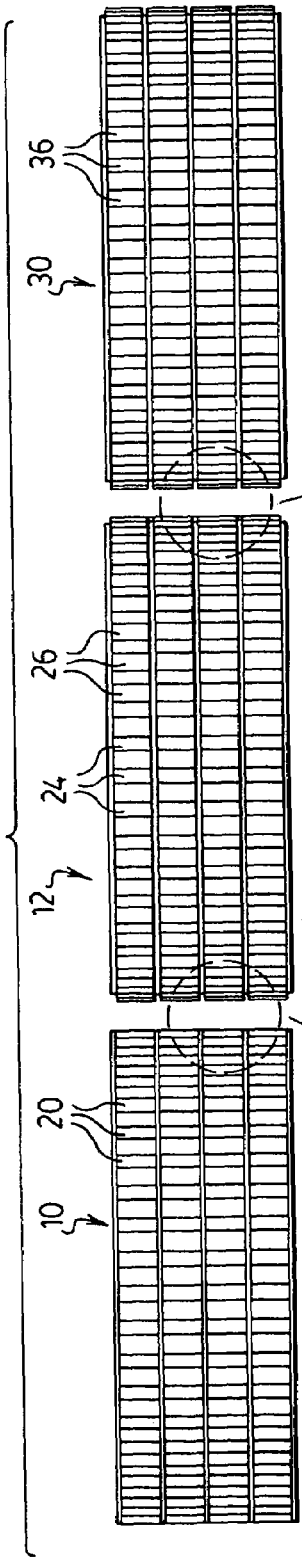
FIG. 5 is an illustration of the relationship of the punching dies, separated from each other for clarity of illustration.
Figure 7:
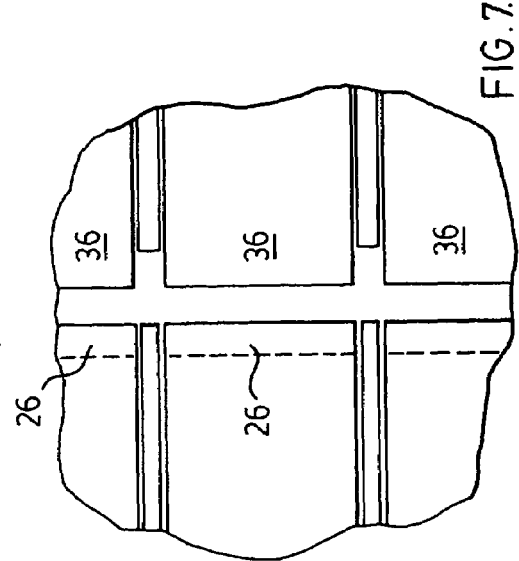
FIG. 7 is an enlargement from FIG. 5 which illustrates the relationship of the dies and the punch-out opening in the second-stage operation.
Figure 6:
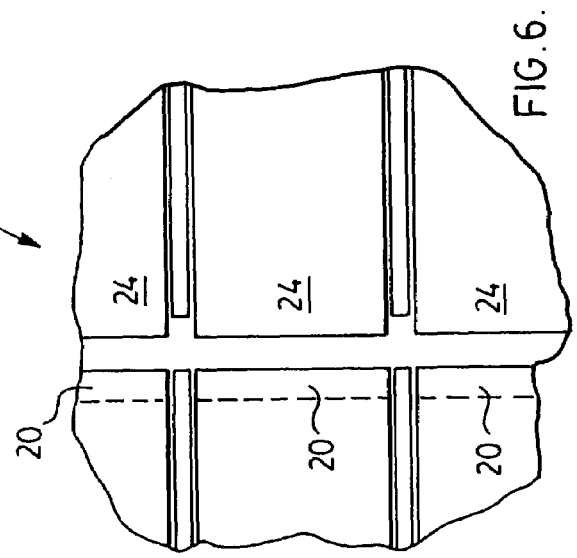
FIG. 6 is an enlargement from FIG. 5 which illustrates the punch-out opening relationship of the dies in the first-stage operation.

With reference first to FIGS. 1–8 and FIG. 11, the apparatus of the invention comprises a first pair of opposed dies 10, 12 mounted for synchronized rotation on shafts 14, 16 respectively in frame 18. As shown more clearly in FIGS. 3 and 4, die 10 is a female die keyed on shaft 14 and has transverse rows of angularly equispaced recesses 20 formed on the periphery thereof. Die 12 is a male/female die keyed on drive shaft 16 having transverse rows of angularly equispaced alternating punches 24 and recesses 26 formed on the periphery thereof. Punches 24 are adapted to mate with and fit recesses 20 of die 10. Each punch 24 has a shoulder 28 formed on each side thereof between punch 24 and adjacent recess 26 for reasons which will become apparent as the description proceeds (FIG. 11). Although three rows of punches and recesses are shown, it will be understood that one, two or more rows of punches and recesses can be used, depending on the requirements of the punched product.

Die 30 mounted for rotation on shaft 32 is a male die keyed on shaft 32 for synchronized rotation with die 12 in frame 18. Male die 30 has angularly equispaced transverse rows of punches 36 adapted to mate with and fit in rows of recesses 26 of die 12 between punch shoulders 28. Although recesses and punches are shown equispaced, the recesses and punches can be spaced as desired for the final product, both angularly about the periphery of the dies and transversely across the width of the dies.

Dies 10, 12 and 30 are driven by anti-lash gears 33, 34 and 35 mounted on shafts 14, 16 and 32 respectively.

During rotation of dies 10, 12 and 30, strip 38 guided by strip guide 19 between dies 10 and 12 is punched in a first stage by sequential insertion of transverse rows of punches 24 on die 12 into transverse rows of mating recesses 20 on die 10. Punch-out material 40 is discharged from female die 10 as shown in FIG. 9. The strip 38 is keyed onto male/female die 12 by engagement of strip 38 between rows of punches 24 as die 12 rotates to feed strip 38a between male/female die 12 and male die 30. Strip 38a is punched in a second stage, by insertion of rows of punches 36 of male die 30 into mating recesses 26 of male/female die 12 for displacement of punch-out material 42 into recesses 26 between punch shoulders 28 with punched strip 38b discharged from the assembly. Punch-out material 42 is discharged from die 12 (FIG. 9).

Referring now to the enlarged views of FIGS. 4, 6, 7 and 11, punches 24 of male/female die 12 are adapted to be inserted into opposed recesses 20 of female die 10 as the dies rotate. In like manner, punches 36 of male die 30 are adapted to be inserted into opposed recesses 26 of male/female die 12 between shoulders 28 of punches 24 as the dies rotate.

FIGS. 1, 2, 9 and 10 illustrate the cam roller assembly of the invention for ejecting punch-outs 40, 42 shown in FIG. 9. A plurality of equispaced transverse roller rods 50 having caps 52 at each end fit loosely through openings 56 in side plates 58, 60 of female die 10 and male/female die 12 for guided rotary travel in opposed cam raceways 62 and 64 of dies 10, 12 respectively. As shown more clearly in FIGS. 9 and 10, each of a plurality of angular segments 66 mounted in an annulus formed in proximity to the perimeter of each of dies 10, 12 continuously about the perimeter of the dies is adapted to receive a rod 50 therethrough in snug-fitting relationship and is adapted for controlled radial travel in each of cam raceways 62, 64 as the dies 10, 12 rotate.

Each angular segment 66 has three angularly equispaced radial ejector pins 70 adapted to project through recesses 20. In operation, angular segments 66 of female die 10 are moved radially outwardly at the 6 o'clock position 62a of raceway 62 for segment 66a to eject punch-outs 40. Angular segments 66 of male/female die 12 are moved radially outwardly at the 3 o'clock position 64a of raceway 64 for segments 66b to eject punch-outs 42.

Turning now to FIGS. 8a–8c, FIG. 8b shows first-stage openings depicted by numeral 44 having a length A, width B+CC, wire width C1 between adjacent openings 44, and space D between openings 44; and FIG. 8c shows second-stage openings depicted by numeral 48 having a length A, width B, wire width C1+CC laterally between adjacent openings 48, and wire width C2 longitudinally between openings 44 and 48, in which:

| | |
|---|---|
| A = | length of opening in direction of rotation |
| B = | width of opening transversely to direction of rotation |
| C1 and C2 = | wire width |
| CC = | cutter clearance |
| D = | distance between first-stage openings (C2 + A + C2) |

In operation, turning now to FIG. 8b, strip 38 has a first set of spaced-apart transverse rows of holes 44 punched out during travel between dies 10 and 12, punch-outs 40 having a length A longitudinally in the process direction and a transverse width B+CC. C1 depicts the wire width in the process direction. A transverse space D between each row 44 of punched holes is punched between dies 12 and 30 as shown in FIG. 8c to produce a second set of transverse rows of holes 48 having a length A in the process direction and transverse width B. C2 depicts the transverse wire width, i.e. perpendicular to the process direction.

The accuracy and tolerance of the grid product is dependent upon the accuracy and tolerances of the machine itself. Material indexing is dependent upon gearing and the interaction between the three shafts and their tooling. It is therefore imperative that the gears and shafts be made to exact specifications. Improper meshing of the drive gears can result in too little clearance or interference on one side of the tooling. To cleanly shear deformable material such as lead and lead alloy, it is also important to have a very tight tolerance between male and female dies. The optimum clearance (CC) between cutting surfaces is quite strictly defined within the range of 0.0005 to 0.004 inch preferably about 0.0015 inch between cutting edges. If the shearing edges are too far apart from each other, the material will not cut properly and partially-punched holes will result. If the shearing edges are too close to each other, the edges might catch and bind, which can result in the machine seizing. Since the tooling is made of hard and brittle D2 steel, the tooling may also chip or break if the machine seizes, resulting in costly repairs and shut down.

EXAMPLE

A prototype module illustrated most clearly in FIGS. 1, 2 and 9–11 was built to examine the viability of rotary hole punching. The machine utilized three rows of tooling to produce three transverse rows of punched holes in a given strip of lead alloy. For "Test 1", cast and rolled forms of both pure and alloyed lead were run through the machine. Punching of the closely spaced and high tolerance holes was 100% successful.

The wire width of a lead alloy grid produced was about 0.030 inch and approximately 85% of the strip material was removed as waste. Up to about 96% the strip material can be removed as waste, leaving a wire thickness as thin as 0.010 inch. The thickness of strip material tested was about 0.030 inch.

Additional Tests

Seven more tests were conducted with the rotary punching machine, to determine whether it was capable of performing the same accurate and precise operation for producing 0.030 wire width on various materials, other than lead, with the following material thicknesses: test 2, 0.007 inch and 0.015 inch aluminium; test 3, 0.010 inch brass; test 4, 0.023 inch copper; test 5, 0.012 inch and 0.025 inch cardboard; test 6, 0.020 inch and 0.030 inch Mylar; test 7, 0.016 inch steel; test 8, 0.007 inch, 0.016 inch and 0.025 inch zinc. There was no variation between the characteristics of these results and those obtained from punching lead strip. The holes were punched in a uniform manner with the same precision and no compromise to tolerances or mesh quality speed. Variation of the rotary speed of the rotary punch permitted a high operational speed for the precision hole puncher.

A punched strip of a thickness of about 0.030 inch having a plurality of longitudinally-spaced transverse rows of punched holes representing up to about 96% material removed, with a wire thickness as thin as 0.010 inch, can be cut into battery plates of equal length. The plates are pasted and stacked vertically as negative plates alternating with positive plates separated from one another by plate separators in a plastic case with a cover. Grid tabs formed on the negative plates are interconnected by a metal header to a negative battery post and grid tabs formed on the positive plates are interconnected by a metal header to a positive battery post. Sulphuric acid solution is added in an amount to submerge the battery plates to form a lead acid battery.

The present invention provides a number of important advantages. High-speed production of punched strip having an array of high tolerance, closely-spaced holes is permitted from deformable strip, particularly lead and lead-alloy strip. The success of the precision tolerancing is believed due to the self-indexing system which makes use of the male dies 12 on shaft 16. The male dies punch the strip material, which then stays seated on the die punches 24 of die 12 to act as the indexing mechanism for the strip. In this way, the strip material is anchored by the punched holes and the strip material is accurately positioned for the next sequence of holes to be punched without any compromise as to location. Maximum hole size and hole spacing are practically limitless, depending only on customer requirements. Hole shapes are also variable with substantially no geometric limitations.

It will be understood that other embodiments and examples of the invention will be readily apparent to a person skilled in the art, the scope and purview of the invention being defined in the appended claims.

The invention claimed is:

1. A method of continuously punching an array of closely-spaced holes in a deformable strip in a rotary punch which comprises feeding said deformable strip between a female rotary die having a cylindrical periphery with a plurality of spaced recesses formed on the cylindrical periphery and a male/female rotary die having a cylindrical periphery with a plurality of alternating spaced punches and recesses formed on the cylindrical periphery for mating of said punches of the male/female rotary die with corresponding said recesses of the female die, rotating said female and male/female dies concurrently for punching a first set of spaced holes in the deformable strip along the deformable strip, feeding said punched deformable strip between said male/female rotary die and a male rotary die having a cylindrical periphery with a plurality of spaced punches formed on the cylindrical perimeter for mating of said punches of the male rotary die with corresponding said recesses of the male/female rotary die, and rotating said male/female die concurrently with the male die for punching a second set of holes in the strip between the first set of spaced holes along the deformable strip.

2. A method as claimed in claim 1, continuously ejecting punched material from the female rotary die and the male/female rotary die.

3. A method as claimed in claim 2, in which the recesses formed on the female rotary die, the alternating punches and recesses formed on the male/female rotary die, and the punches formed on the male die are variably spaced along the strip and/or across the strip, or staggered across the strip.

4. A method as claimed in claim 2, in which the recesses formed on the female rotary die, the alternating punches and recesses formed on the male/female rotary die, and the punches formed on the male die are equispaced.

5. A method of continuously punching an array of closely-spaced holes in a deformable strip in a rotary punch which comprises feeding said deformable strip between a female rotary die having a cylindrical periphery with a plurality of spaced recesses formed on the cylindrical periphery and a male/female rotary die having a cylindrical periphery with a plurality of alternating spaced punches and recesses formed on the cylindrical periphery for mating of said punches of the male/female rotary die with corresponding said recesses of the female die; rotating said female and male/female dies concurrently for punching a first set of spaced holes in the deformable strip transversely of the deformable strip along the deformable strip, feeding said punched deformable strip between said male/female rotary die and a male rotary die having a cylindrical periphery with a plurality of spaced punches formed on the cylindrical perimeter for mating of said punches of the male rotary die with corresponding said recesses of the male/female rotary die, and rotating said male/female die concurrently with the male die for punching a second set of holes in the strip transversely of the deformable strip between the first set of spaced holes along the deformable strip.

6. A method as claimed in claim 5, continuously ejecting punched material from the female rotary die and the male/female rotary die.

7. A method as claimed in claim 6, in which the recesses formed on the female rotary die, the alternating punches and recesses formed on the male/female rotary die, and the punches formed on the male die are variably spaced along the strip and/or across the strip, or staggered across the strip.

8. A method as claimed in claim 6, mounting a plurality of angular segments continuously about an annulus formed in each of the cylindrical female die and the cylindrical male/female die in proximity to the perimeter of the respective cylindrical dies, each angular segment having at least one ejector pin for radial reciprocal travel in a die recess, and moving the angular segments radially outwardly at a selected angle of rotation of the cylindrical female die and of the cylindrical male/female die for continuously ejecting punch-out material from the die recesses.

9. A method as claimed in claim 8, providing a plurality of cam rollers extending loosely across each of the cylindrical female die and the cylindrical male/female die, each cam roller passing through an angular segment for moving said angular segment radially inwardly and outwardly in the die annulus for reciprocal radial movement of a die ejector pin in a die recess, and moving the cam rollers and associated angular segments outwardly at a selected angle of rotation of each of the dies whereby the angular segment ejector pins eject punch-out material from the cylindrical dies at the selected angles of rotation.

10. A method as claimed in claim 9, mounting opposite ends of the cam rollers in opposed stationary cam raceways formed on each side of each cylindrical die for controllably moving the cam rollers radially inwardly and outwardly as the dies rotate.

11. A method as claimed in claim 10, in which the recesses formed on the female rotary die, the alternating punches and recesses formed on the male/female rotary die, and the punches formed on the male die are variably spaced along the strip and/or across the strip, or staggered across the strip.

12. A method as claimed in claim 10, in which the recess formed on the female rotary die and on the male/female rotary die are equispaced.

13. A method as claimed in claim 8, in which the deformable strip is selected from the group of strips consisting of lead, lead alloys, aluminum, brass, copper, steel, zinc, plastics, vinyl and cardboard.

14. A method as claimed in claim 8, in which the deformable strip is lead or lead alloy.

15. A method as claimed in claim 5, in which the recesses formed on the female rotary die, the alternating punches and recesses on the male/female rotary die, and the punches on the male die are equispaced.

* * * * *